US006654879B1

(12) United States Patent
Rehbock et al.

(10) Patent No.: US 6,654,879 B1
(45) Date of Patent: Nov. 25, 2003

(54) METHOD AND APPARATUS FOR ANALYZING CODE FOR OUT-OF-RANGE DATA INVOLVING BASE AND SEED TABLES/LISTS

(75) Inventors: Steven Robert Rehbock, West Chicago, IL (US); Daniel Lawrence Deco, Inverness, IL (US)

(73) Assignee: Northbrook Services, Northbrook, IL (US)

( * ) Notice: Subject to any disclaimer, the term of this patent is extended or adjusted under 35 U.S.C. 154(b) by 0 days.

(21) Appl. No.: 09/353,319

(22) Filed: Jul. 14, 1999

Related U.S. Application Data

(63) Continuation-in-part of application No. 09/177,634, filed on Oct. 23, 1998, now abandoned, which is a continuation-in-part of application No. 08/792,193, filed on Jan. 30, 1997, now Pat. No. 5,828,890.

(51) Int. Cl.[7] .......................... G06F 17/30; G06F 15/00; G06F 11/00
(52) U.S. Cl. .......................... 712/244; 714/15; 714/39; 714/35; 714/38; 714/48
(58) Field of Search ............................ 712/244; 714/15, 714/39, 35, 38, 48

(56) References Cited

U.S. PATENT DOCUMENTS

| | | | |
|---|---|---|---|
| 5,146,569 A | | 9/1992 | Yamaguchi et al. |
| 5,446,904 A | | 8/1995 | Belt et al. |
| 5,539,907 A | * | 7/1996 | Srivastava et al. ............. 703/26 |
| 5,600,836 A | | 2/1997 | Alter |
| 5,668,989 A | | 9/1997 | Mao |
| 5,797,117 A | | 8/1998 | Gregovich ................... 707/101 |
| 5,809,500 A | | 9/1998 | Nolan ............................ 707/6 |
| 5,897,633 A | | 4/1999 | Nolan ............................ 707/6 |
| 6,009,269 A | * | 12/1999 | Burrows et al. ............... 714/38 |
| 6,206,584 B1 | * | 3/2001 | Hastings ....................... 714/35 |
| 6,263,457 B1 | * | 7/2001 | Anderson et al. .............. 714/26 |

FOREIGN PATENT DOCUMENTS

| | | | |
|---|---|---|---|
| GB | 2 285 155 A | 6/1995 | |
| WO | 9528672 | 10/1995 | |

OTHER PUBLICATIONS

Ross, Tom, "Technical Advantages of LE/370 and COBOL/370," Guide, IBM Santa Teresa Laboratory, Oct. 1994, pp. 2, 4, 6.
Ross, Tom, "Soving the Year 2000 problem with COBOL and LE/370," Language Products, IBM Santa Teresa Laboratory, Oct. 1994, pp. 2, 4, 6, 8, 10, and 12.
Crema, Alice, "IBM COBOL for the MVS & VM Environment," IBM Santa Teresa Laboratory, Oct. 24, 1995, Charts 3–30.
International Business Machines Corporation, The Year 2000 and 2–Digit Dates: A Guide for Planning and Implementation, 1995.
Mattes, Paul, "Year 2000 . . . The Mainframe's Revenge," Chicago Chapter Platform Association for Computing Machinery, Feb. 1996, pp. 2–4.
Fowler, Donald R., "The Year 2000 An Enterprise–Wide Issue," IBS Conversions, Inc., 1996, pp. 1–10.
"Year 2000 Enhancement," Tools C.00.001 patch tape for the HP MMII, revision date: Oct. 20, 1994, Hewlett–Packard Co.
Goodwin B, "The end is near! Are you prepared?", Skystem Development, Mar. 1, 1992, pp. 6–9, XP000571031.
Swoyer T, "A strategy for handing the year–2000 Problem," Edpacs, vol. 23, No. 11, May 1996, pp. 1–13.

* cited by examiner

*Primary Examiner*—Krisna Lim
(74) *Attorney, Agent, or Firm*—Finnegan, Henderson, Farabow, Garrett & Dunner, L.L.P.

(57) ABSTRACT

Methods, and systems consistent with the present invention can detect out-of-range data conditions, such as when an overflow occurs or when the instruction attempts to operate on invalid data, during the execution of windowed code. Specifically, methods and systems consistent with the present invention maintain a list of instructions to be monitored and then execute the instructions with hexadecimal data. Such methods and systems can determine when a year 2000 problem exists with a particular instruction by comparing the list of instructions to be monitored with the instructions after the substituted data.

36 Claims, 9 Drawing Sheets

METHOD AND APPARATUS FOR ANALYZING CODE FOR OUT-OF-RANGE DATA INVOLVING BASE AND SEED TABLES/LISTS

RELATED APPLICATIONS

This application is a continuation-in-part of U.S. patent application Ser. No. 09/177,634, filed Oct. 23, 1998, now abandoned which is a continuation-in-part of U.S. patent application Ser. No. 08/792,193, filed Jan. 30, 1997, now U.S. Pat. No. 5,828,890, all of which are incorporated herein by reference.

BACKGROUND OF THE INVENTION

The present invention relates generally to the field of processing data that lies outside of a defined range, and more specifically to the solution of data processing problems, such as the year 2000 problem, that arise from programming conventions and techniques based on certain erroneous assumptions.

As the end of the current millennium approaches, many companies worry about data processing problems expected to occur in the year 2000. Programs written over the last few decades have represented the current year with only two decimal digits, assuming the first two digits always to be "19." That assumption fails for the year 2000, and calculations involving that year may produce incorrect results.

The most common way of solving this problem has been to hire programmers familiar with the programs of concern or with the languages of those programs. Those programmers then study the code of the programs and change the code where appropriate. While certainly a direct approach, this solution has many problems.

One key problem is that of human error. This solution assumes that the programmer will find all of the relevant code problems, which is an unreasonable assumption for some applications that may have a million lines a code or more. Another problem arises from the assumption that the programming fixes will not cause other problems, such as calculations. A third problem is the cost of such an approach, which can be great because the task is so labor-intensive. Finally, documentation problems, as well as a scarcity of programmers, make this solution difficult to implement.

The year 2000 problem is representative of a larger class of programming problems involving invalid or overflow data. Data assuming an unanticipated value, such as exceeding an allowable range, does not necessarily mean the program is behaving improperly. For example, programming conventions may have made assumptions that are no longer valid.

A need exists for a technique to detect and correct these problems that is neither labor intensive nor susceptible to human error. Such a technique would save a great deal of resources and time, and provide high reliability.

SUMMARY OF THE INVENTION

Methods, and systems consistent with the present invention can detect out-of-range data conditions, such as when an overflow occurs or when the instruction attempts to operate on invalid data, during the execution of windowed code. Specifically, methods and systems consistent with the present invention maintain a list of instructions to be monitored and then execute the instructions with hexadecimal data. Such methods and systems can determine when a year 2000 problem exists with a particular instruction by comparing the list of instructions to be monitored with the instructions after the substituted data.

Methods consistent with the present invention, in a data processing system for monitoring the operation of a program, include creating a list of instructions in the program to be monitored, determining whether instructions from the list of instructions causes an error during execution of the program, and saving the determined instructions and data associated with the instruction when it is determined that instructions from the list causes an error.

Both the foregoing general description and the following detailed description provide examples consistent with this invention and explain how to make and use systems and methods consistent with the invention. These descriptions do not restrict the claimed invention.

BRIEF DESCRIPTION OF THE DRAWINGS

The accompanying drawings, which are incorporated in and constitute a part of this specification, illustrate an implementation of the invention and, together with the description, explain the principles of the invention. In the drawings.

DESCRIPTION OF THE PREFERRED IMPLEMENTATION

A. Overview

Reference will now be made in detail to preferred implementations of the invention, examples of which are illustrated in the accompanying drawings. Where appropriate, the same reference numbers in different drawings refer to the same or like parts. The implementation described below specifically addresses the year 2000 problem although, as explained below, the invention has much a broader applicability of allowing correct operation for certain invalid data or for certain operations that would normally cause an out-of-range condition. An out-of-range condition can be an overflow resulting from program execution, or an operand that is not in the proper format.

Although a computer can process numbers in both decimal notation and hexadecimal (base 16) notation, computers cannot process both types of numbers simultaneously. Therefore, numbers are declared as decimal or hexadecimal, and computer programs represent the date as two decimal digits corresponding to the current decade and year. A method consistent with this invention for addressing the year 2000 problem notes when the binary number representing the decade changes from the 9th to the 10th decade, because such an operation will cause an overflow. With most current programs, this will cause one of two problems. Either the decade value will become "0" and cause erroneous processing, or the computer program will crash.

Methods and systems consistent with this invention avoid these problems by noting when this condition occurs and treating the decade value as hexadecimal number. For example, representing the year 2000 with two digits involves making the decades digit the hexadecimal number of "A," or 10. Giving control to procedures that perform the needed operations on data represented in different formats allows continued operation of the program. Thus, a program that has functioned correctly up to the year 1999 can continue doing so even after the year 2000. Moreover, implementing a trace routine, which records information when certain actions occur, helps identify the portions of the programs that are vulnerable to the year 2000 problem or to other conditions arising because of out-of-range data.

When procedures and routines consistent with this invention operate with programs running in their normal course, those programs can continue to operate as designed. When such procedures and routines operate with copies of existing programs taken off-line, so a data processor can simulate conditions of concern (such as setting the system date to the year 2000), then the trace routines can note any problems that occur.

B. Environment

Figure 1:
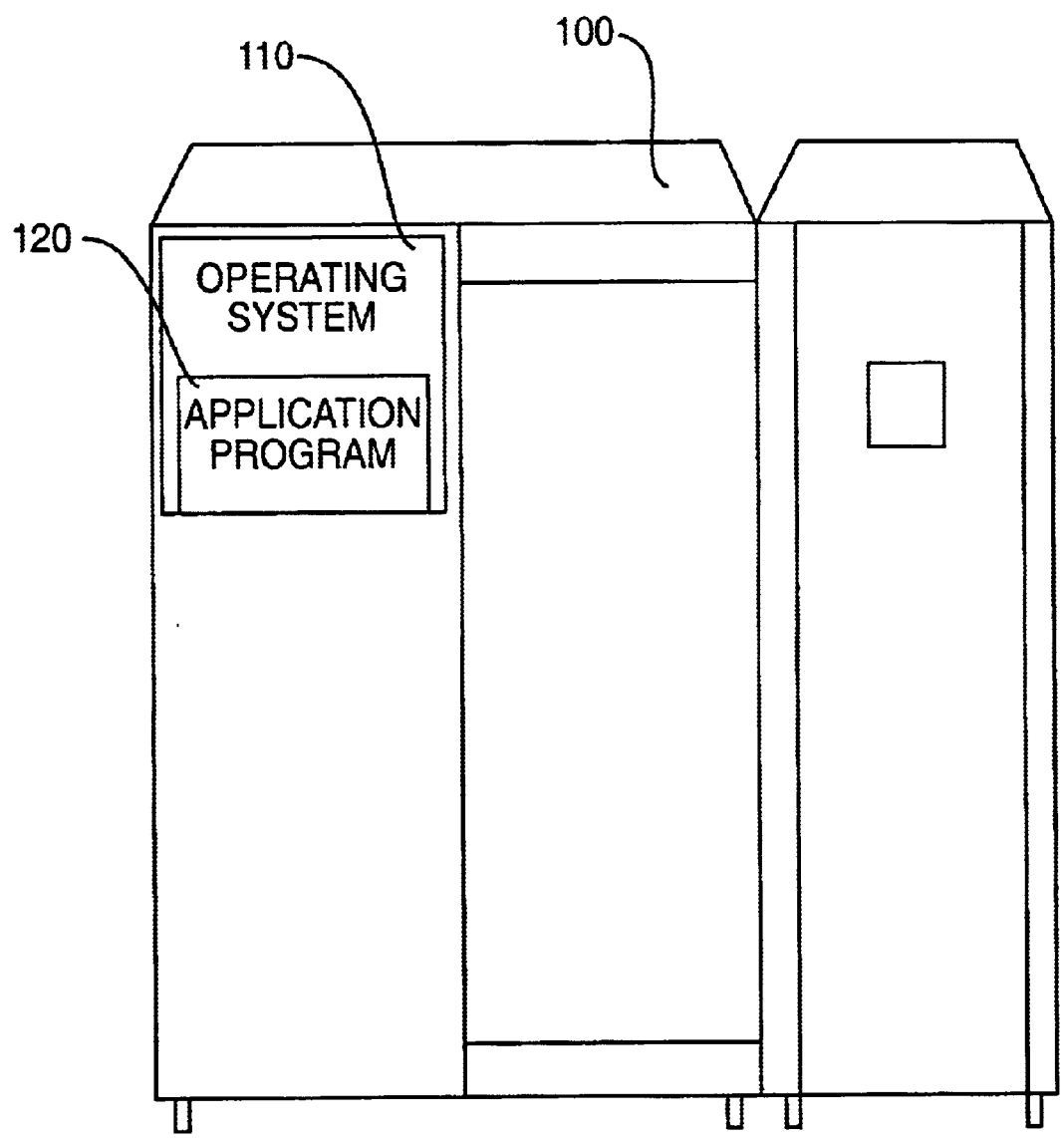
FIG. 1 is a block diagram of a data processing system capable of implementing procedures consistent with this invention.

FIG. 1 is a block diagram of a mainframe computer 100 that can execute methods consistent with this invention. Computer 100 is shown as a mainframe computer because many of the problems for the year 2000 will occur on such computers. This invention, however, does not depend upon any particular size or model of data processor, nor on any particular components of that processor.

Mainframe computer 100 is shown as running operating system 110, such as the MVS operating system from IBM Corp. Again, this invention is not limited to a particular operating system. The only requirement of the operating system is that it be able to detect and trap on conditions of interest, such as instructions that create out-of-range data or use such data.

Application program 120 runs under the control of operating system 110 so operating system 110 can suspend the execution of program 120 if necessary. For purposes of this description, application program 120 creates or attempts to use out-of-range data, such as what might occur for dates representing the year 2000. Any other characteristics of application program 120 are not critical to this invention.

C. Initialization

Figure 2:
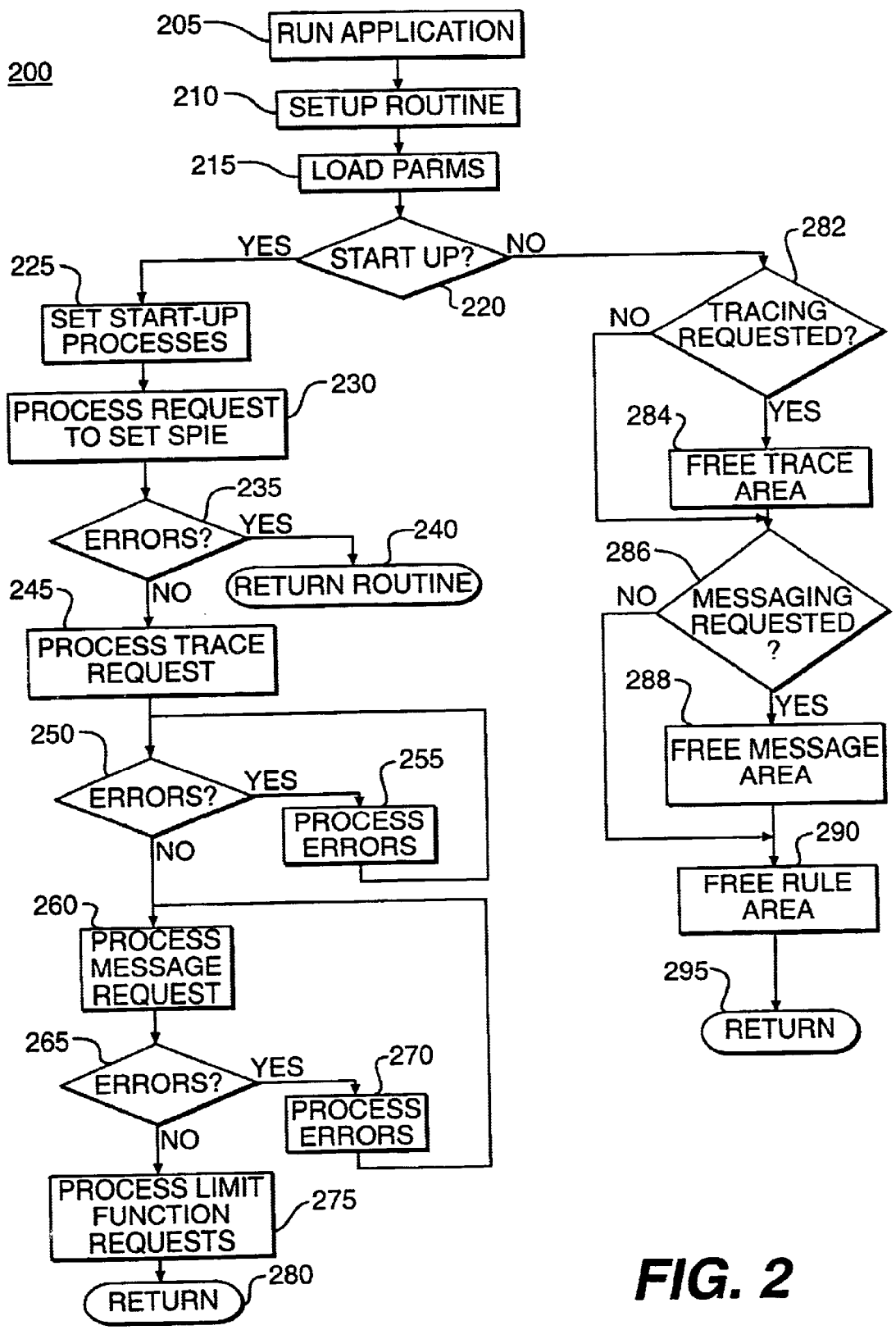
FIG. 2 is a flow diagram of a process for initializing and terminating a program to operate consistent with this invention.

FIG. 2 is flow diagram of a procedure 200 for initializing and terminating the procedure that addresses the overflow and invalid data occurrences. The application is running (step 205) when it calls a set-up routine 210.

Figure 3:
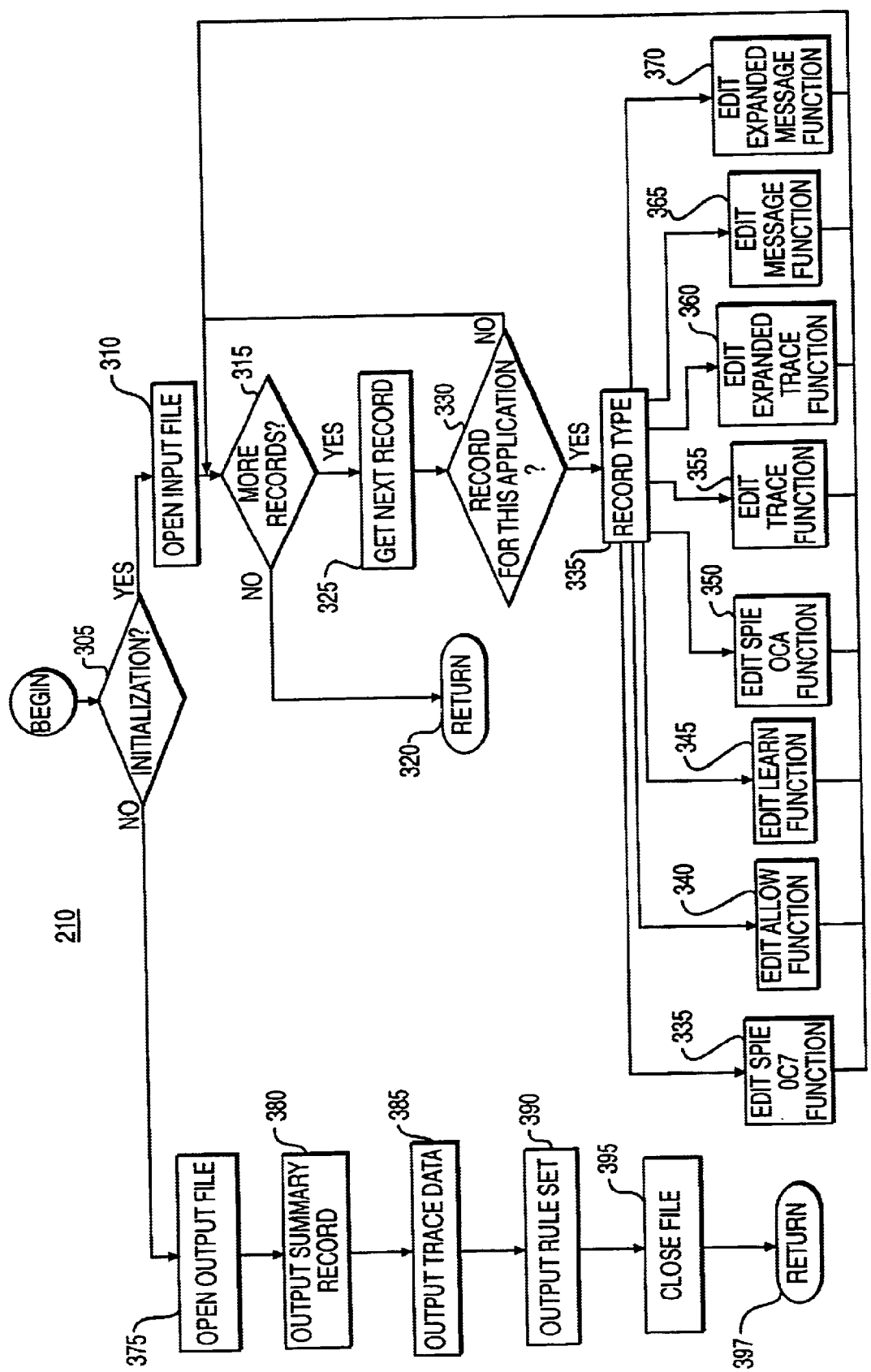
FIG. 3 is a flow diagram for a setup routine called by the procedure in FIG. 2.

FIG. 3 shows a flow diagram of steps that set-up routine 210 performs consistent with this invention. The introductory determination of routine 210 is whether the procedure calling routine 210 is seeking initialization or termination (step 305). If it is seeking initialization, then a corresponding input file is opened to receive data (step 310), and an initialization loop begins. The purpose of the loop is to check for records corresponding to the application being monitored. These records can be preset with procedure 200. If no records have been preset, a default set of records is used.

When no more records remain to be analyzed for this application (step 315), the initialization loop has completed, and control returns to procedure 200. Otherwise, the next record is fetched (step 325). The records contain parameters and identify functions to be performed.

If the record does not apply to the current application, then the next record is fetched, if it exists (steps 315, 325). If the record applies to the current application, then the appropriate action depends on the type of the record (step 335). For example, if the record indicates a ESPIE 0C7 function (the ESPIE is explained below), which traps instructions trying to operate on invalid data, then the appropriate notation is made to trap in such instructions (step 335).

If the record indicates an allow function, the appropriate notation is made (step 340). The allow function limits the values of the invalid data for which action will be taken, such as when the date, or the operand of concern, should only assume certain specific values. For example, if the date will never exceed the year 2009, then using the allow function can limit actions only to occasions when the decade value assume to the hexadecimal of "A," which, in a two decimal representation of dates, corresponds to the decade of years 2000 and 2009.

If the record indicates a learn function, the appropriate notation is made (step 345). The learn function permits the procedure to form rules for instructions not previously encountered.

If the record indicates the ESPIE 0CA function the appropriate notation is made (step 350). The ESPIE 0CA function traps on instructions that cause an overflow.

The remaining records pertain to actions desired to be taken when out-of-range conditions exist: trace functions and messages. Trace functions record information about the instruction executing when an out-of-range data condition occurred. The preferred implementation has two types of trace functions. A basic trace function (step 355) records only basic information, such as the locations in the program where an overflow or invalid data occurred, or how many times instructions with the overflow or invalid data occurred. An expanded trace function (step 360) records additional information, such as the data in the fields.

The preferred implementation of this invention can also support two different kinds of messaging. If the application program wants basic messages with only a minimum amount of information, such as that a condition with invalid or overflow data occurred, there would be a record for the message function (step 365). If the application desired more information, there would be a record for an expanded message function (step 370).

After each record is processed, another record is fetched, if one exists (steps 315, 325). If not, processing continues with procedure 200.

If the call was made to this routine not for initialization but for termination, then an output file is opened (step 375) to permit outputting information. This file would hold any summary records (step 380), any trace data collected (step 385), and any rule sets (step 390). Summary records are records of statistics and control information that pertain to the entire routine 210, such as the application name, the number of lines in the offset, and sample data, and the time the routine was run. Trace records, on the other hand, relate to specific conditions that triggered the processes described below. Finally, the file would be closed (step 395) with control returned to procedure 200 (step 397).

Returning to procedure 200 in FIG. 2, after the set-up routine, the parms are loaded (step 215). Parms are information about the processing, such as those created in steps 335–370 of FIG. 3. There are no parms when procedure 200 is called for termination.

If procedure 200 is called at start-up (step 220), certain start-up processes are set (step 225), and a request to set the ESPIE is processed (step 230). The ESPIE is a supervisory program for MVS that interrupts on certain conditions, such as the presence of invalid data or the presence of an operation which causes an overflow.

Figure 7:
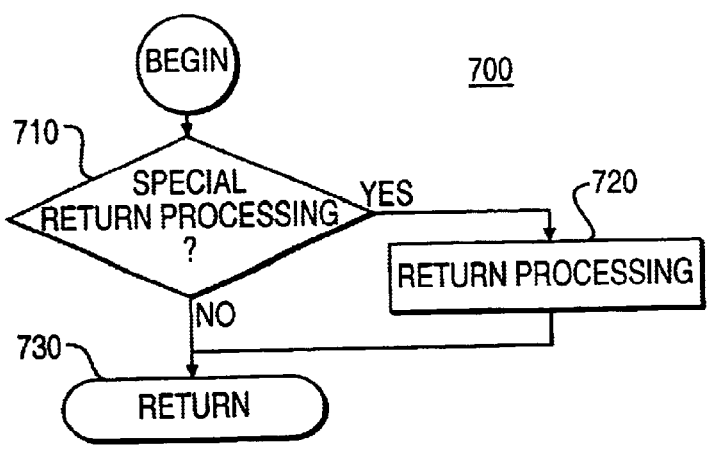
FIG. 7 is a flow diagram of a return routine called by the procedure in FIG. 4 and the routines in FIGS. 5 and 6.

If any errors occur in setting the ESPIE (step 235), control is sent to the return routine 700 in FIG. 7. Otherwise, the trace request is processed (step 245). If any errors occur in this processing (step 250), those errors are processed (step 255).

Error processing involves making corrections if possible, or aborting if not. Next, any message request is processed (step 260). If there are any errors (step 265), these are processed (step 270).

Finally, any limit function requests from the allow function are processed (step 275). At this point, initialization is complete (step 280).

If procedure 200 were called and this were not start-up (step 220), then the various areas used during processing are freed for use by other processes. If tracing had been requested (step 282), the trace area would be freed (step 284). If messaging had been requested (step 286), the message area would be freed (step 288). Finally, the rule area would be freed (step 290). At this point, procedure 200 would be finished (step 295).

D. Operation

Figure 4:
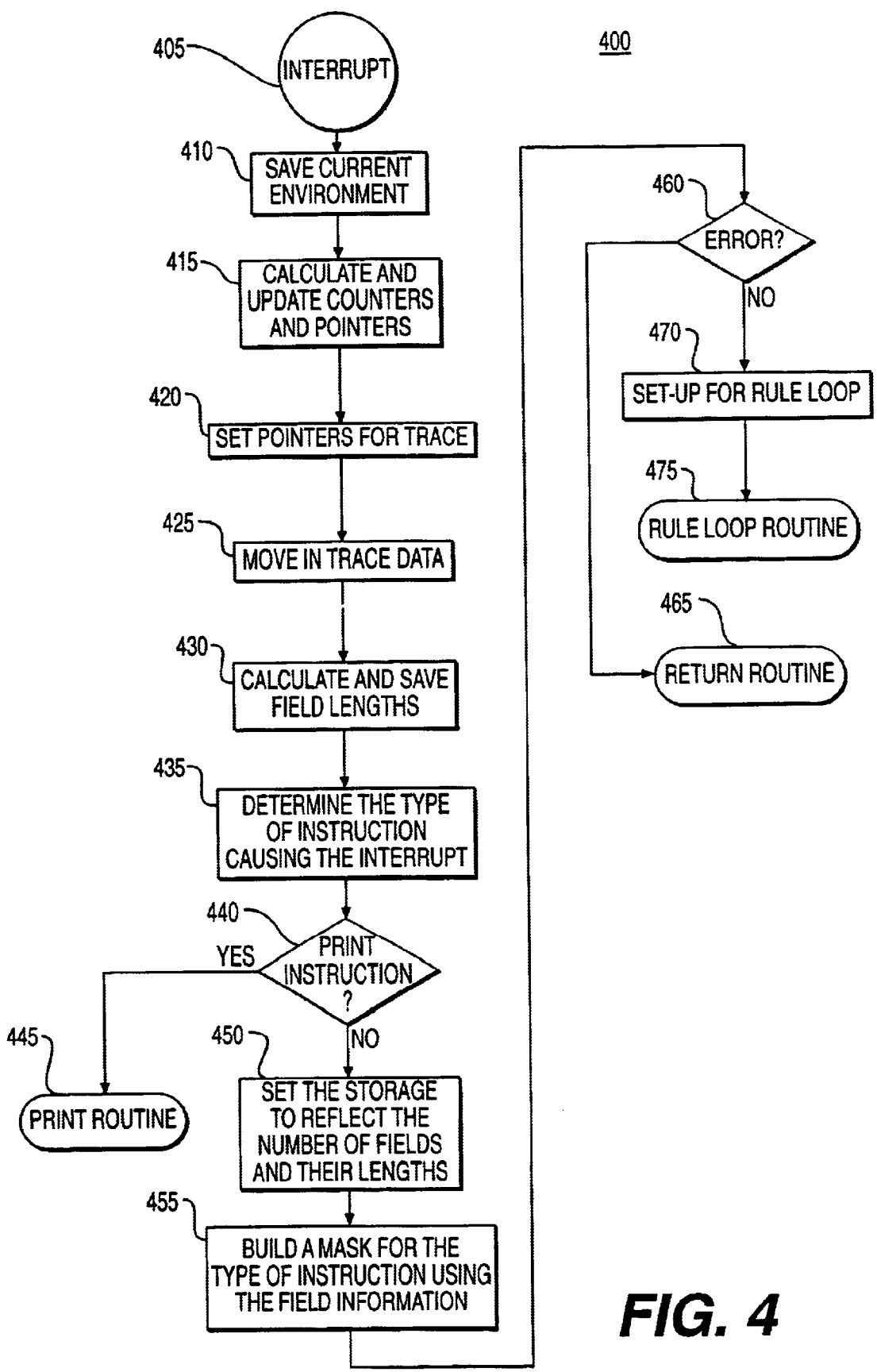
FIG. 4 is a flow diagram of a procedure for responding to interrupts caused by out-of-range data in the application program.

After initialization, the application program continues to run as intended. When that program tries to execute an instruction with an operand having out-of-range values, or when that program has an instruction that creates a result that has an out-of-range value (assuming either or both had been selected) and any other conditions are satisfied, the ESPIE traps and causes an interrupt. FIG. 4 shows a flow diagram 400 of a procedure called in response to such an interrupt. In response to that interrupt (step 405), procedure 400 will suspend operation of the application and save a copy of the current environment (step 410), including the program status word, in order to process the corrections. Next, procedure 400 calculates and updates any counters and pointers associated with procedure 400 (step 415). The counters include counters of the number of interrupts generated, the number of times each rule is encountered, the number of times a particular instruction causes an interrupt. The pointers include pointers to the different tables and variables.

If a trace has been requested during the set-up, the pointers are set for the trace (step 420). These pointers include indications of where to store new trace data. In addition, the trace data is moved into a trace table (step 425).

Figure 6:
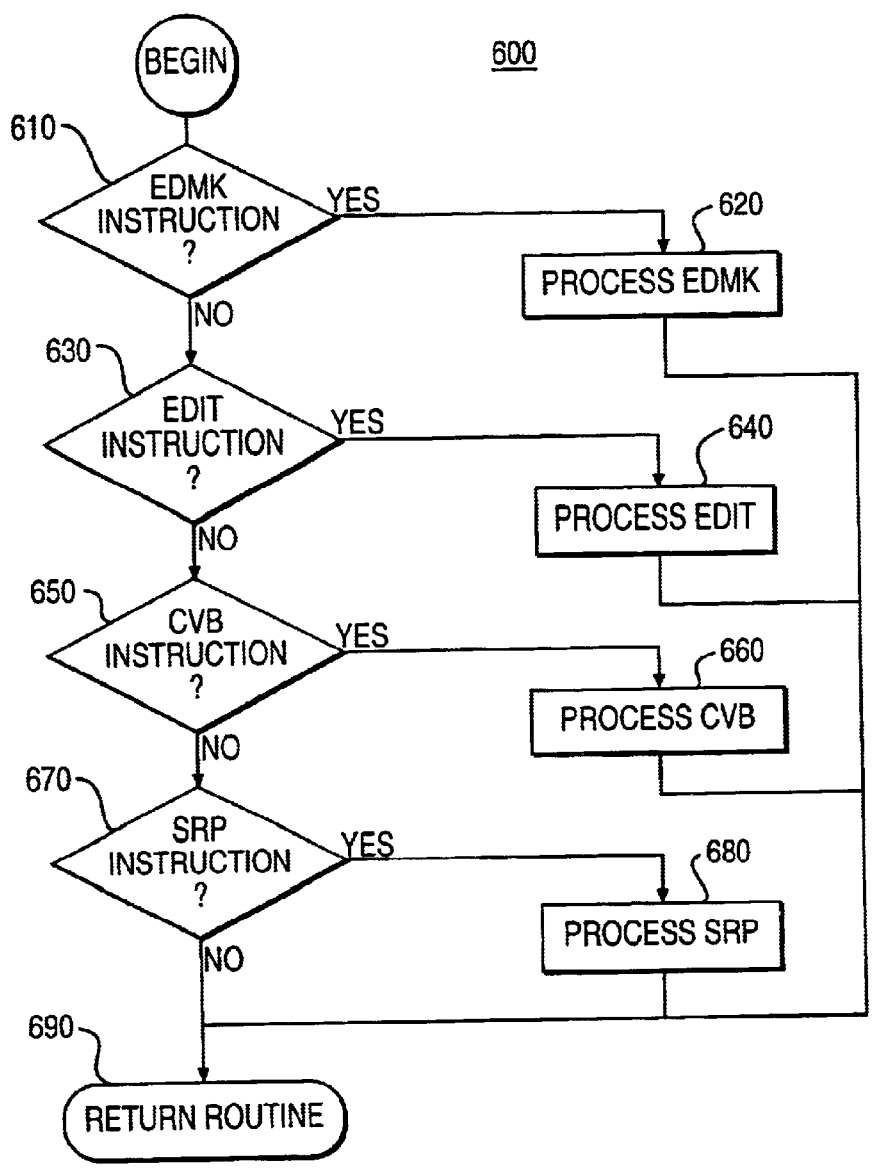
FIG. 6 is a flow diagram of a print routine called by the procedure in FIG. 4 and by the routine of FIG. 5.

Next, procedure 400 calculates and saves the field lengths for the instruction causing the interrupt (step 430), and determines the type of that instruction (step 435). If that instruction was a print instruction (step 440), then print routine 600 in FIG. 6 is called.

Otherwise, storage is set to reflect the number of fields and their lengths (step 450), and procedure 400 builds a mask for the type of instruction using the field information. The mask is a summary of the unique parts of the instruction, such as the number of operands, the length of the operands, and the position of the invalid data in the operand.

If an error has been detected (step 460), then return routine 700 in FIG. 7 is called. The types of errors detected generally arise from conditions inconsistent with a date correction, such as invalid data in two operand positions or invalid data in the wrong operand position. If no error is corrected, pointers to a rule database are created for the rule loop (step 470), and the rule loop routine is called (step 475).

Figure 5:
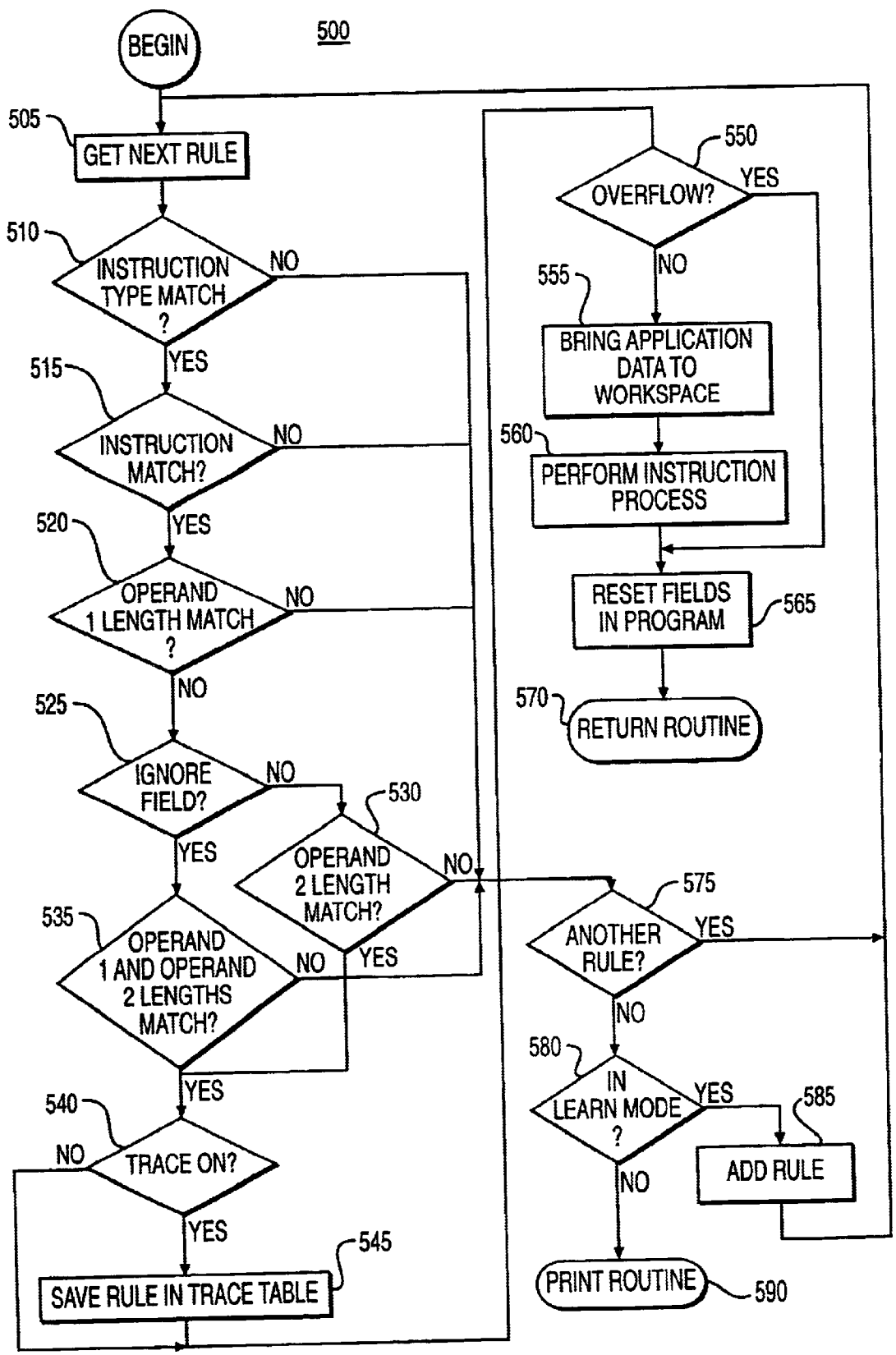
FIG. 5 is a flow diagram of a rule loop routine called by the procedure in FIG. 4.

FIG. 5 is a flow diagram of rule loop routine 500. The purpose of routine 500 is to find a rule that pertains to the instruction that caused the interrupt, and then to take the appropriate action to finish that instruction.

After the next rule is fetched from the rule data base (step 505), a series of inquiries begins to determine whether the instruction causing the interrupt matches the fetched rule exactly. If there is not a match of instruction type (step 510), instruction (step 515), and length of the first operand (step 520), then the current rule does not match. Furthermore, if the rule does not ignore that field (step 525), and there is no match of both operands (step 530) or of the second operand (step 535), then the current rule also does not match.

If the rule matches because there were consistent matches of instruction type, instruction, and lengths of operands (steps 510, 515, 520, 525, 530, and 535), then the rule matches. The next inquiry is whether the trace is on (step 540). If so, then the rule is saved in a trace table (step 545).

The next inquiry relates to the cause of the interrupt. If the interrupt occurred because there was invalid data (as opposed to an overflow) (step 550), and the appropriate ESPIE was activated, then the application data from the instruction is brought into an internal work space (step 555). Next, the data processor executes instructions to perform the operations corresponding to the interrupted instruction (step 560). The operations take place in the work space on the operands using the saved environment. For example, assume the date field had "A9" for the year indicator, which would correspond to the year 2009. The "A9" would appear as an invalid decimal number. If an instruction sought to increment that value by "1," the data processor could not perform a decimal addition because the carry from the year position from adding "1 " to "9" would require adding a "1" to the hexadecimal "A." Therefore, the data processor would perform a hexadecimal addition on the "A" representing the decade value. The result in this example would be "B0, " representing the year 2010.

After that process completes, or if the interrupt were caused because of an overflow (which as only occurs after the instruction has executed) (step 550), the fields are reset, with adjusted data, into the program (step 565). Then return routine 700 in FIG. 7 is called (step 570).

If the current rule did not match (steps 510–535), and another rule exists (step 575), then that rule is fetched and the loop continues. Otherwise, routine 500 determines whether the learn mode has been activated (step 580). If so, a new rule is added to match the particular instruction that caused the interrupt (step 585), and the loop resumes. The next rule fetched would be the rule just added. There will necessarily be a match, and the appropriate action will take place.

If the learn mode has not been activated, then print routine 600 in FIG. 6 is called to see if the instruction is a print instruction. Print instructions are handled differently from other instructions.

Print routine 600 in FIG. 6 performs print instructions for overflow and invalid data. To do so, routine 600 must sometimes alter fixed fields to ensure correct printing. For example, if a date were printed as "19XX," where "XX" was a two-digit date, the "19" would need to be changed, perhaps to "20," to accommodate values of "XX" greater than "99."

Routine 600 lists typical print instructions, but this list is not meant to be exhaustive. Other print instructions could be handled as well.

If the instruction causing the interrupt is an edit and mask instruction (step 610), which inserts nonnumerical data, then that instruction is performed by printing out the invalid data as a valid number (step 620). If the interrupting instruction is an edit instruction (step 630), which places its operands into appropriate character representations, that instruction is processed with the invalid date. For example, the hexadecimal "A" in the year notation "A0," would appear as the year "2000," rather than "19A0."(step 640).

If the interrupting instruction is a CVB instruction (step 650), which converts decimal representations to binary, then that print instruction is performed by converting the invalid data to binary (step 660). For example, the hexadecimal "A," would appear as "1010."

If the instruction is an SRP instruction (step 670), which is a shift round instruction sometimes used to discard the high order digits, then that instruction is also performed with the invalid data (step 680)

If print routine 600 does not recognize any of these instructions (steps 610, 630, 650, 670), then return routine 700 is called (step 690).

Return routine 700 in FIG. 7 takes care of any problems that have occurred during the processing of the other routines. For example, if there are errors that need processing or if messages need to be printed out because action could not be taken, such processing or printing occurs in routine 700.

Routine 700 first asks whether there is any special return processing (step 710). Return processing allows individual users to perform any processing they wish or need, such as for their own statistics. Such processing also finishes any other pending matters. If there is such processing, it is performed (step 720). After such processing, or if none is required, the program state is restored and the application program resumes operating (step 730).

E. Windowed Code

In addition to treating decade values as hexadecimal numbers, methods and systems consistent with this invention can detect year 2000 problems by monitoring applications using windowed code. Windowed code provides a convenient way to section part of the century. For example, a 20-year window could represent the year 2000 as "00," year 2001 as "01" . . . and year 2020 as "20." A representation of "30," on the other hand, would represent the year "1930." By monitoring the windowed code, methods and systems consistent with the present invention may watch decimal instructions as well as logical instructions. Logical instructions include instructions such as Move, Display, or Store. Decimal instructions include instructions such as Add, Subtract, or Multiply.

Figure 8:
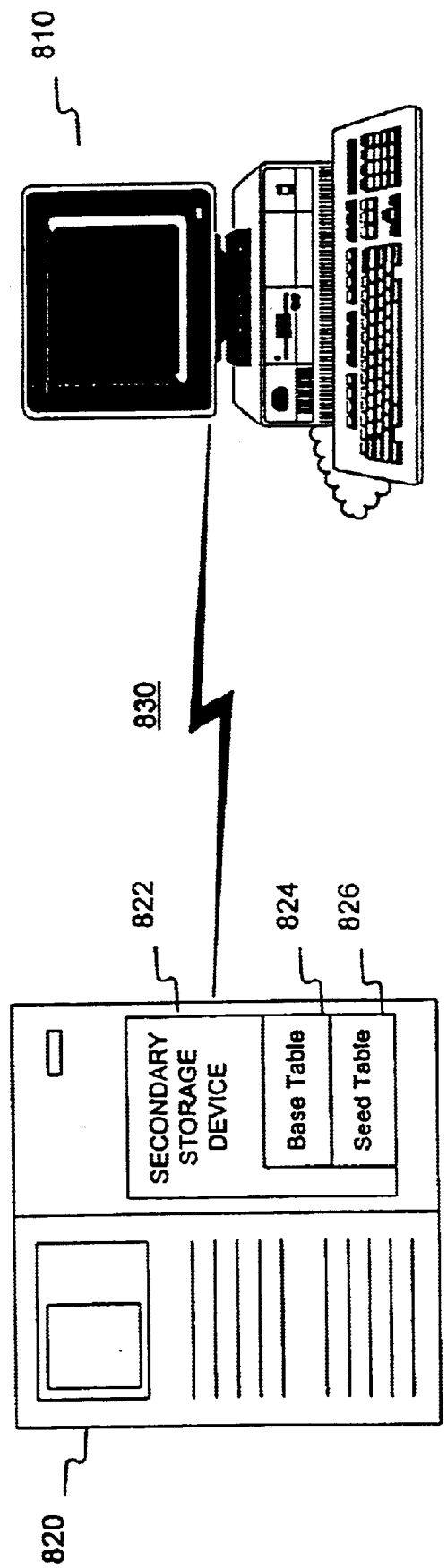
FIG. 8 depicts a block diagram of a computer system in which interfaces consistent with the present invention may be implemented.

FIG. 8 depicts an alternative embodiment for data processing system 800 capable for practicing methods and systems consistent with the present invention. Data processing system 800 comprises a client computer 810 coupled to a mainframe 820 suitable for monitoring applications using the windowed code. Mainframe 820 is similar to mainframe 100 in FIG. 1 and has the additional capability to transmit information to client computer 810 via network 830. Mainframe 820 also includes a secondary storage device 822 that contains base table 824 and seed table 826.

Figure 9:
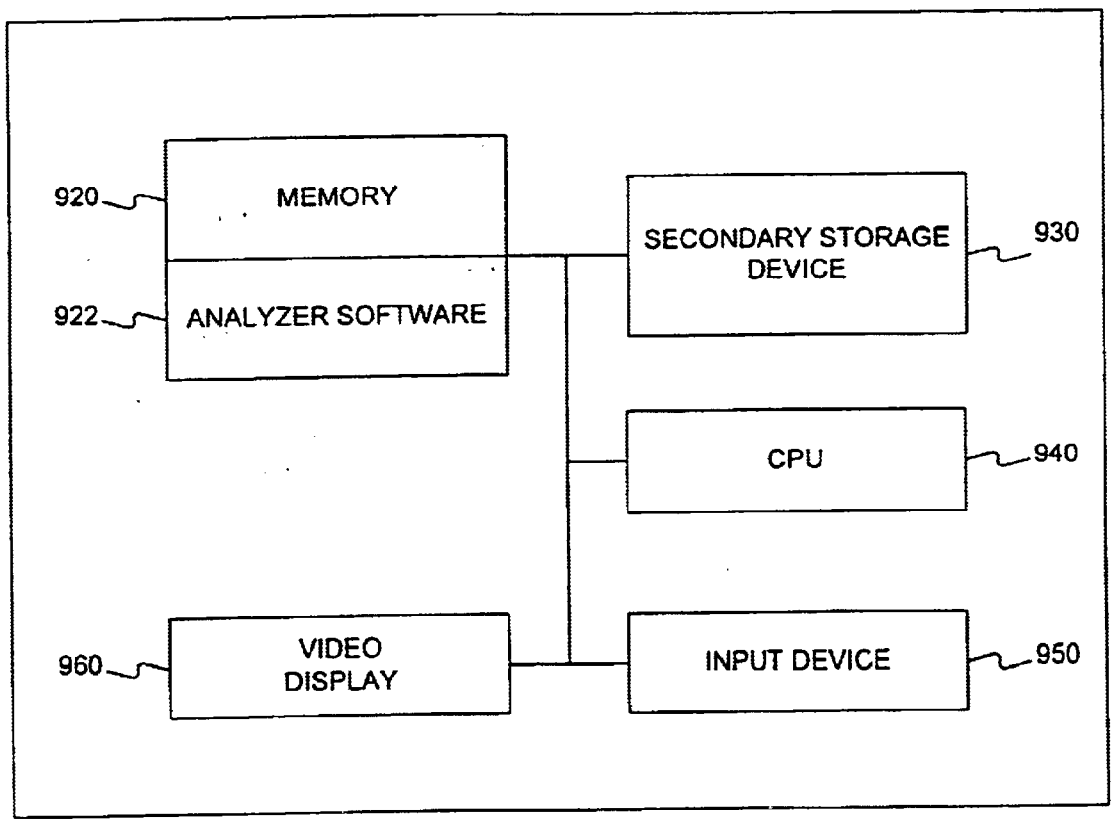
FIG. 9 depicts a more detailed diagram of the client computer depicted in FIG. 8.

FIG. 9 depicts a more detailed diagram of client computer 810, which contains a memory 920, a secondary storage device 930, a central processing unit (CPU) 940, an input device 950, and a video display 960. Memory 920 includes analyzer software 922 that allows a user to analyze information from the windowed code.

Figure 10:
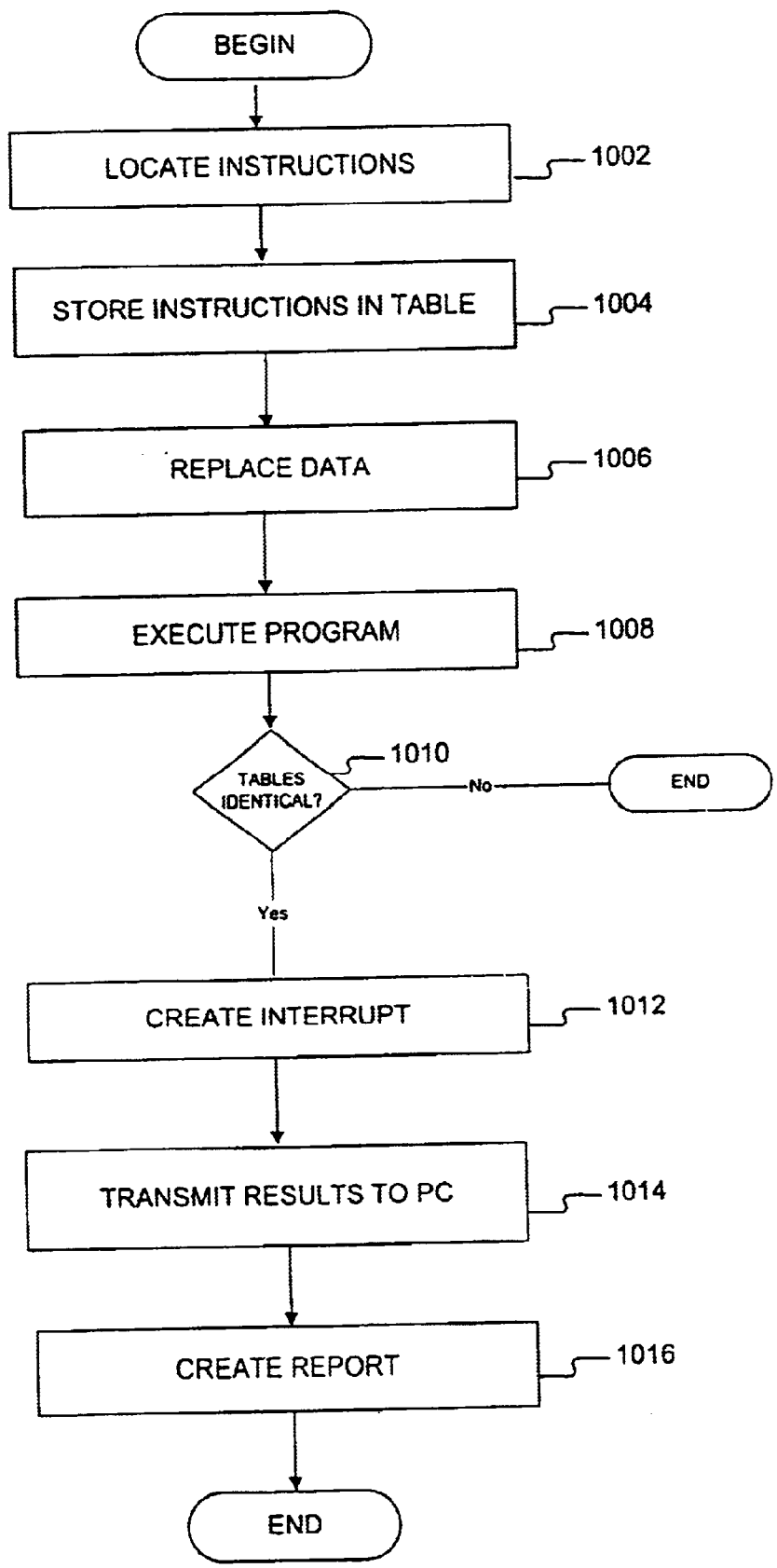
FIG. 10 depicts a flow chart of the steps performed when using the computer system of FIG. 2.

FIG. 10 depicts a flow diagram of a procedure 1000, executed by computer 800, for detecting out-of-range data conditions by monitoring windowed code in, for example, application program 120. Before application program 120 is initiated, procedure 1000 prepares application program 120 to be monitored. This preparation involves locating instructions that will be monitored (step 1002), such as by scanning the object code of application program 120. One skilled in the art will appreciate that other methods may be used to locate instructions that will be monitored, such as manually inputting the instructions.

As each instruction is located during preparation, procedure 1000 marks the instruction and stores a copy in base table 824 (step 1004). Each instruction can be marked by changing the interrupt associated with the instruction to "OC1," which allows the OC1 interrupt to be used to track the instructions during execution of application program 120. Base table 824 contains a list of records corresponding to marked instructions that will be tracked during execution of application program 120, each record containing, for example, instructions, offsets, and opcodes. Base table 824 thus contains data that is executed under normal conditions that will not create out-of-range dates.

Before execution of the application program, procedure 1000 also replaces the windowed dates with hexadecimal values (step 1006). Once all the dates are replaced, the application program initiates, executes the instructions, traps the interrupts, and continues to process the hexadecimal data as described above, with reference to FIGS. 4 through 7 (step 1008).

During execution, procedure 1000 creates seed table 826 that contains a list of the marked instructions, similar to base table 824. As each instruction containing the OC1 interrupt is executed, procedure 1000 compares the corresponding seed table 826 and base table 824 records. If there are no out-of-range errors during execution of the particular instruction, the seed table record and the base table record will contain identical information. If the record is not identical, however, is executed out-of-order, seed table 826 and base table 824 will contain unmatched records (step 1010). At this point, procedure 1000 may initiate the OC1 interrupt and indicate an error (step 1012). By initiating the OC1 interrupt, procedure 1000 may obtain information regarding the instruction, such as the contents of the fields, offsets, length of instruction, and opcode of the instruction.

Once the OC1 interrupt is initiated, procedure 1000 may transmit an audit trail to client computer 810 (step 1014). An audit trail is a record that indicates the information regarding the instruction. Procedure 1000 may transmit the audit trail to client computer 810 with the well-known 3270 terminal emulation. One skilled in the art will appreciate that other methods may be used to transmit the audit trail to client computer 810, such as the well known TCP/IP protocol.

Once client computer 810 collects the audit trail data, analyzer software 922 examines the trail and performs various queries (step 1016). By querying the audit trail for particular patterns of errors or instructions, analyzer software 922 may produce formatted reports that are easily read regarding date related operations. For example, a report may include MOVE statements that indicate an out-of-range date in application program 120.

CONCLUSION

Persons skilled in the art will recognize that various modifications and variations can be made in the methods and apparatus consistent the present invention without departing from the scope or spirit of the invention. For example, other instructions can be processed, other conditions can be set, other types of invalid data can be analyzed, and other processing can take place.

Such persons will recognize these other implementations of the invention from considering the specification and practicing the invention. The specification and examples are only exemplary. The following claims indicate the true scope and spirit of the invention.

What is claimed is:

1. A processor capable of monitoring the operation of a program, the processor comprising:

means for receiving first data on the program;

means for replacing windowed code in the program with hexadecimal data, wherein the windowed code reflects one portion of a data range;

means for executing the program with the replaced windowed code to generate second data; and means for determining whether an error occurred in the executed program using the first data and the second data.

2. The processor according to claim 1, wherein the first data includes a base table.

3. The processor according to claim 2, wherein the base table includes data that will not create an out-of-range error when the program is executed.

4. The processor according to claim 1, wherein the first data includes a list of records corresponding to instructions in the program.

5. The processor according to claim 1, wherein the second data includes a seed table.

6. The processor according to claim 1, wherein the second data includes a list of records corresponding to instructions in the program executed with the replaced windowed code.

7. The processor according to claim 1, wherein the data range reflects a range of years.

8. The processor according to claim 7, wherein the windowed code sections part of a century associated with the range of years.

9. The processor according to claim 1, wherein the means for receiving the first data comprises:

means for locating instructions in the program; and means for creating a base table from the located instructions.

10. The processor according to claim 1, wherein the means for determining whether the error occurred comprises:

means for comparing the first data and the second data;

means for determining whether the first data and the second data are substantially the same; and means for indicating that the error occurred when the first data and the second data are not substantially the same.

11. The processor according to claim 1, further comprising:

means for transmitting information associated with at least one of the first data and the second data to a computer for analysis; and means for creating a report on the computer according to the analysis.

12. The processor according to claim 11, wherein the means for creating the report comprises means for querying the information on date-related operations.

13. A computer-readable medium for controlling a computer system to monitor the operation of a program, the computer-readable medium comprising:

a first module for receiving first data on the program;

a second module for replacing windowed code in the program with hexadecimal data, wherein the windowed code reflects one portion of a data range;

a third module for executing the program with the replaced windowed code to generate second data; and a fourth module for determining whether an error occurred in the executed program using the first data and the second data.

14. The computer-readable medium according to claim 13, wherein the first data includes a base table.

15. The computer-readable medium according to claim 14, wherein the base table includes data that will not create an out-of-range error when the program is executed.

16. The computer-readable medium according to claim 13, wherein the first data includes a list of records corresponding to instructions in the program.

17. The computer-readable medium according to claim 13, wherein the second data includes a seed table.

18. The computer-readable medium according to claim 13, wherein the second data includes a list of records corresponding to instructions in the program executed with the replaced windowed code.

19. The computer-readable medium according to claim 13, wherein the data range reflects a range of years.

20. The computer-readable medium according to claim 19, wherein the windowed code sections part of a century associated with the range of years.

21. The computer-readable medium according to claim 13, wherein the first module further:

locates instructions in the program; and creates a base table from the located instructions.

22. The computer-readable medium according to claim 13, wherein the fourth module further:

compares the first data and the second data;

determines whether the first data and the second data are substantially the same; and indicates that the error occurred when the first data and the second data are not substantially the same.

23. The computer-readable medium according to claim 13, further comprising:

a fifth module for transmitting information associated with at least one of the first data and the second data to a computer for analysis; and a sixth module for creating a report on the computer according to the analysis.

24. The computer-readable medium according to claim 23, wherein the sixth module further queries the information on date-related operations.

25. A method for monitoring the operation of a program, the method comprising:

receiving first data on the program;

replacing windowed code in the program with hexadecimal data, wherein the windowed code reflects one portion of a data range;

executing the program with the replaced windowed code to generate second data; and determining whether an error occurred in the executed program using the first data and the second data.

26. The method according to claim 25, wherein the first data includes a base table.

27. The method according to claim 26, wherein the base table includes data that will not create an out-of-range error when the program is executed.

28. The method according to claim 25, wherein the first data includes a list of records corresponding to instructions in the program.

29. The method according to claim 25, wherein the second data includes a seed table.

30. The method according to claim 25, wherein the second data includes a list of records corresponding to instructions in the program executed with the replaced windowed code.

31. The method according to claim 25, wherein the data range reflects a range of years.

32. The method according to claim 31, wherein the windowed code sections part of a century associated with the range of years.

33. The method according to claim 25, wherein receiving the first data comprises:

locating instructions in the program; and creating a base table from the located instructions.

34. The method according to claim 25, wherein determining whether the error occurred comprises:

comparing the first data and the second data;

determining whether the first data and the second data are substantially the same; and indicating that the error occurred when the first data and the second data are not substantially the same.

35. The method according to claim 25, further comprising:

transmitting information associated with at least one of the first data and the second data to a computer for analysis; and creating a report on the computer according to the analysis.

36. The method according to claim 35, wherein creating the report comprises querying the information on date-related operations.

* * * * *